United States Patent
Banerjee et al.

(10) Patent No.: US 11,711,366 B2
(45) Date of Patent: Jul. 25, 2023

(54) SCALABLE ONBOARDING FOR INTERNET-CONNECTED DEVICES

(71) Applicant: VMWARE, INC., Palo Alto, CA (US)

(72) Inventors: Swarnadeep Banerjee, Bangalore (IN); Prashant Shubham, Bangalore (IN); Ashutosh Dwivedi, Bangalore (IN); Agila Govindaraju, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 241 days.

(21) Appl. No.: 17/013,706

(22) Filed: Sep. 7, 2020

(65) Prior Publication Data
US 2022/0021671 A1 Jan. 20, 2022

(30) Foreign Application Priority Data
Jul. 16, 2020 (IN) .............................. 202041030422

(51) Int. Cl.
*H04L 9/40* (2022.01)

(52) U.S. Cl.
CPC ........ *H04L 63/0876* (2013.01); *H04L 63/101* (2013.01); *H04L 63/102* (2013.01); *H04L 63/18* (2013.01)

(58) Field of Classification Search
CPC . H04L 63/0876; H04L 63/101; H04L 63/102; H04L 63/18
See application file for complete search history.

(56) References Cited

U.S. PATENT DOCUMENTS

| | | | |
|---|---|---|---|
| 10,560,448 B1* | 2/2020 | Witten | H04L 63/0823 |
| 2010/0125635 A1* | 5/2010 | Axelrod | H04L 63/0838 380/255 |
| 2015/0121470 A1* | 4/2015 | Rongo | H04L 63/083 726/4 |
| 2019/0230063 A1* | 7/2019 | McCready | H04L 63/101 |
| 2020/0177589 A1* | 6/2020 | Mangalvedkar | G06F 16/245 |
| 2020/0213360 A1* | 7/2020 | Ojha | H04L 45/24 |
| 2020/0358760 A1* | 11/2020 | Krishan | G06F 21/45 |
| 2021/0021589 A1* | 1/2021 | Malhotra | H04L 63/0838 |
| 2021/0176638 A1* | 6/2021 | Heldt-Sheller | H04W 12/50 |

* cited by examiner

*Primary Examiner* — Robert B Leung
(74) *Attorney, Agent, or Firm* — Clayton, McKay & Bailey, PC

(57) ABSTRACT

Examples described herein include systems and methods for onboarding a device into a management system. An example method can include loading a management agent onto the device and receiving inventory information for the device. The example method can further include receiving a request to whitelist the device. In some examples, the request originates from a different device, such as a device used by a technician installing the connected device. The management server can authorize the device and add it to the whitelist. After authorizing the device, the management server can onboard the device by sending management information to the management agent on the device. The management server can then exercise management control of the device through the management agent installed on the device.

20 Claims, 4 Drawing Sheets

SCALABLE ONBOARDING FOR INTERNET-CONNECTED DEVICES

RELATED APPLICATIONS

Benefit is claimed under 35 U.S.C. 119(a)-(d) to Foreign Application Serial No. 202041030422 filed in India entitled "SCALABLE ONBOARDING FOR INTERNET-CONNECTED DEVICES", on Jul. 16, 2020, by VMware, Inc., which is herein incorporated in its entirety by reference for all purposes.

BACKGROUND

Enterprises can manage a large number of devices from a central server for better control over security, configurations, and device management. Traditional managed devices, such as laptops and phones, include user interface hardware such as screens and keyboards. This hardware can be used to assist with enrollment, or "onboarding," into a management system. Further, these devices can be located close to the enterprise, easing the enrollment process for a system administrator.

Increasingly, enterprises seek to manage "connected devices," which can refer to any type of internet-connected device such as an Internet of Things ("IoT") device, gateway device, or IP-connected device. New types of connected devices appear every day, but can include devices such as computers, phones, security cameras, appliances, vehicles, and sensors, for example. The term "connected device" as used herein is intended to capture all of these types of devices.

Enrolling a connected device into a management system can be difficult and time consuming in certain scenarios. For example, some connected devices do not include a screen or keyboard for convenient user interfacing. Additionally, connected devices may be installed in remote or difficult to reach locations, such as security cameras that are installed along a ceiling or roofline. For these types of devices, the traditional enrollment process is cumbersome and slow.

Additionally, traditional enrollment for connected devices can carry security risks. For example, if an administrator must create a name and password for each security camera that is installed, it is likely that the names and passwords will be very similar to one another. As another example, a connected device can be accessed by enabling a secure shell ("SSH") port to allow remote access—however, this opens the device up to connection from any source rather than only from a trusted source.

As a result, a need exists for systems and methods for onboarding connected devices in an easy and scalable manner.

SUMMARY

Examples described herein include systems and methods for onboarding a device into a management system. An example method can include loading a management agent onto the device. For example, when a device is purchased by an enterprise, it can be connected with a management server such that the server can provision the management agent to the device. In large-scale applications, multiple devices could be connected to a local private network that the management server accesses to provide the management agent code to all of the connected devices.

The example method can also include receiving inventory information for the device. The inventory information can include any type of information that identifies the physical device. This can include a serial number, a hardware identifier, model number, media access control ("MAC") address, or a token that includes an indication of one or more pieces of information identifying the physical device. This information can be stored at the management server, for example.

The example method can also include receiving an onboarding request at the management server from the device. In some examples, the device is programmed to automatically request onboarding on boot up. If the device has not been placed on a whitelist at the management server, then the method can further include denying the onboarding request at this stage.

The example method can further include receiving a request to whitelist the device. In some examples, the request originates from a different device, such as a device used by a technician installing the connected device. The technician's device can include an application that communicates with the management server. It can use a camera to scan a QR code or bar code on the connected device or allow the technician to input a serial number from the connected device. The application can send the whitelist request to the management server and include sufficient detail for the management server to identify the device from the records stored previously.

The example method can also include authorizing the device to be added to the whitelist. This stage can be performed in a variety of ways, such as by sending an out-of-band message, such as a short message service ("SMS") message, to the technician. The message can include a code that the technician inputs into the application on the technician's device, which is then transmitted to the management server. After authorizing the device, the management server can onboard the device by sending management information to the management agent on the device. The management server can then exercise management control of the device through the management agent installed on the device.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for onboarding a device into a management system. An example method can include loading a management agent onto the device and receiving inventory information for the device. The example method can further include receiving a request to whitelist the device. In some examples, the request originates from a different device, such as a device used by a technician installing the connected device. The management server can authorize the device and add it to the whitelist. After authorizing the device, the management server can onboard the device by sending management information to the management agent on the device. The management server can then exercise management control of the device through the management agent installed on the device.

The systems and methods disclosed herein provide many advantages over traditional onboarding. For example, there is no need for unique configurations of individual connected devices. Instead, all connected devices purchased by an enterprise can use the same initial bootstrap package, which can include an agent and hardware token. As another benefit, there is no need to share username and password combinations in order to onboard a device. Instead, each device has a unique hardware token which makes the authentication process more secure. As yet another advantage, the onboarding process can occur without enabling an SSH port or using SSH credentials. Another benefit is that whitelisting can be performed from any place after the device is switched on at the location, rather than needing the technician to be present at the device. The whitelisting process can be defined by the enterprise. Finally, the disclosed approach scales well will bulk device configuration and onboarding.

Figure 1:
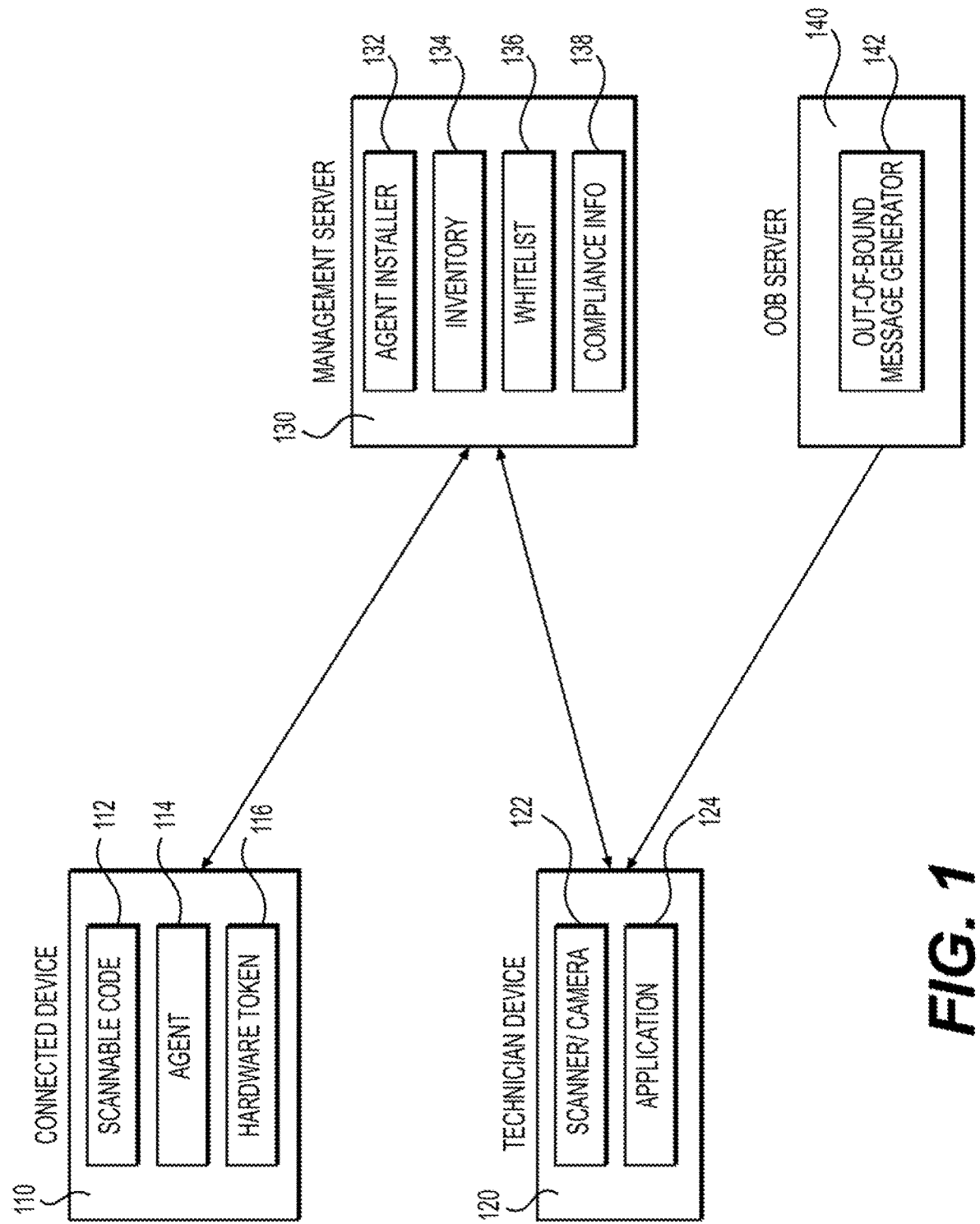
FIG. 1 is an illustration of an example system for onboarding a device into a management system.

FIG. 1 provides an illustration of an example system for onboarding a device into a management system. The system can include a connected device 110. The connected device 110 can be any type of device having a hardware-based processor, memory storage, and the ability to connect to a network such as the internet. For example, the connected device 110 can be a computer, laptop, phone, household appliance, security camera, vehicle, sensor, or any other relevant type of device.

In addition to having a process and memory storage, the connected device 110 can also include a scannable code 112. The scannable code 112 can be physically located on the device 110, such as on a sticker or by being printed or formed on the device 110. Common examples of a scannable code 112 can include a barcode, quick response ("QR") code, or a grouping of alphanumeric characters. The code 112 is "scannable" in the sense that another device having a camera or scanner functionality could scan, or otherwise capture an image of, the code 112.

The connected device 110 can also include a management agent 114. In some examples, the management agent 114 is not necessarily included on the device 110 at the time an enterprise acquires the device 110. The management agent 114 can be provisioned by another device, such as a management server 130, as discussed later in more detail. The management agent 114 can allow the connected device 110 to be managed as part of a unified endpoint management ("UEM") system, in an example. The management server 130 can be part of the UEM system and communicate with the management agent 114 of the connected device 110.

The connected device 110 can further include a hardware token 116. The hardware token can be used to identify the connected device 110 in the UEM system and can be provided by the connected device 110 for UEM onboarding rather than providing a username and password. The hardware token 116 can be a token that describes one or more hardware identifiers associated with the connected device 110. In another example, the token 116 is derived from one or more hardware identifiers associated with the device 110. For example, the token 116 can be based on a serial number, model number, or MAC address of the connected device 110. In some examples, the token 116 includes a hardware identifier embedded within the token 116. The hardware token 116 can be created by a script that captures one or more hardware identifiers associated with the device 110. In some examples, the script is provided to the connected device 110 by the management server 130. An example format of a hardware token 116 can be %SERIAL_NUMBER%_%MODEL_NUMBER%_%MAC%, although other formats can be used as well.

The system of FIG. 1 can also include a technician device 120. The technician device 120 can be used by a technician installing the connected device 110 at its intended location, such as by installing a security camera on a commercial building. The technician device 120 can be a computing device with a hardware-based processor and a memory storage, such as a phone, laptop, or scanner. The technician device 120 can also include a user interface, such as a screen and a hardware- or software-based keyboard. The device 120 can include a scanner 122, which in some examples can be a camera. For example, a camera on a phone can be considered a scanner 122 in the example of FIG. 1.

The technician device 120 can further include an application 124 that allows for communication between the technician device 120 and the management server 130. The application 124 can be used to transmit information about the connected device 110 to the management server 130. For example, the application 124 can transmit scanned information obtained from the scanner 122 of the device 120. It can also allow a technician to request whitelisting of the connected device 110. In some examples, the application 124 can also provide a mechanism for the technician to authenticate him or herself, such as by entering a code sent from an out-of-band server 140.

The technician device 120 can be managed by the management server 130 to maintain sufficient security. For example, the application 124 executing on the technician device 120 can include agent functionality controlled by the management server 130. The agent functionality can allow the management server 130 to receive information regarding the technician device 120, such as its device type, operating system ("OS") type, location, battery life, installed applications, authentication procedures, and any other information about the device 120.

The management server 130 can determine whether the technician device 120 complies with all applicable compliance rules as set forth at the management server 130. If the device 120 is not compliant with one or more rules, the management server 130 can utilize the agent functionality of the application 124 by instructing it to take appropriate remedial action at the device 120. The remedial action can include, for example, locking the device, wiping the device, removing unwanted applications, installing required applications, and providing a notification to the technician or management server 130. Information related to compliance, such as profiles and compliance rules, can be stored as compliance information 138 at the management server 130.

The management server 130 can be a single server or a group of servers working together. The management server 130 can exercise management control over either or both of the connected device 110 and technician device 120 by instructing an agent component on either device. As discussed, the agent components on the respective connected device 110 or technician device 120 can communicate with and carry out instructions from the management server 130.

In one example, the management server 130 includes an agent installer 132. The agent installer 132 can be a software package at the management server 130 that interfaces with a device and installs agent-related code on that device. For example, when an enterprise purchases a connected device 110, it typically will not include agent functionality. The connected device 110 can be connected to the management server 130, such as by joining a VPN that is connected to the management server 130. The agent installer 132 of the management server 130 can transmit the agent 114 to the connected device 110.

The management server 130 can also include inventory storage 134. The inventory storage 134 can be a stored file, or group of files, that contain inventory information relating to the connected device 110. For example, when an enterprise purchases a connected device 110, an inventory entry can be created in the inventory storage 134. In that example, the management server 130 can receive information known about the device 110 at that time. The information can include a purchase date, manufacturer, and a model type, for example. An entry can be created using this information.

The inventory storage 134 can also store more detailed information about the connected device 110 when it becomes available. This can include, for example, a device ID, serial number, hardware token 116, assigned technician, deployment location, and any other relevant information about the device 110. In some examples, the inventory information is provided by the application 124 executing on the technician device 120. In another example, the inventory information is gathered by a script executing on the device 110 and provisioned by the management server 130. In some examples, the inventory information can be gathered in bulk for a number of connected devices 110, such as by using a comma-separated value ("CSV") file or an extensible markup language ("XML") file that includes separate entries for the various connected devices 110. In some examples, a system administrator can manually enter inventory information for a connected device 110 through a console connected to the management server 130, causing the management server 130 to store that inventory information at the inventory storage 134.

The management server 130 can also maintain a whitelist 136. The whitelist 136 can include a list of connected devices 110 that are authorized to be onboarded or otherwise managed by the management server 130. In some examples, the whitelist 136 includes an identification of a hardware token 116 for each authorized device. In another example, the whitelist 136 includes other identifying information such as a device ID or serial number.

Figure 2:
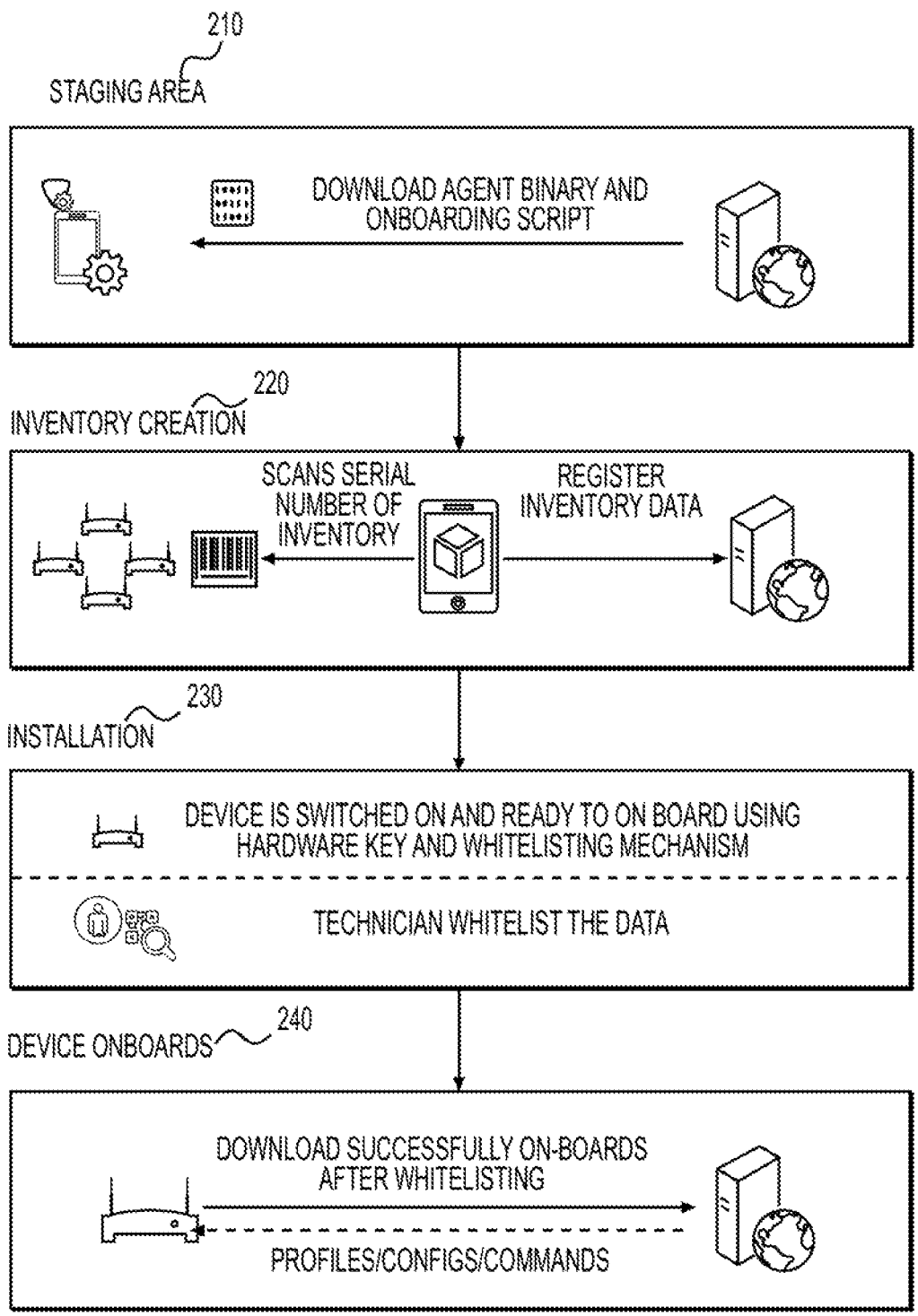
FIG. 2 is a flowchart of an example method for onboarding a device into a management system.
Figure 3:
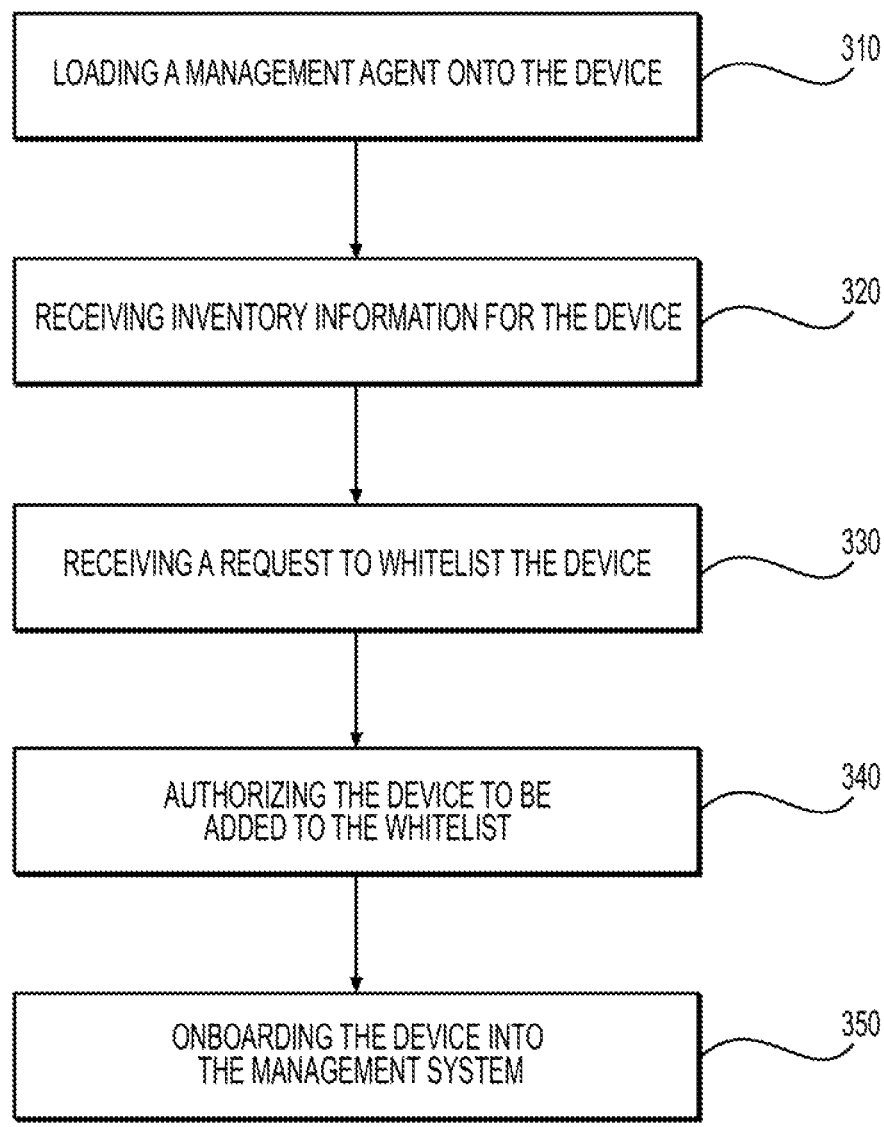
FIG. 3 is a flowchart of an example method for onboarding a device into a management system.
Figure 4:
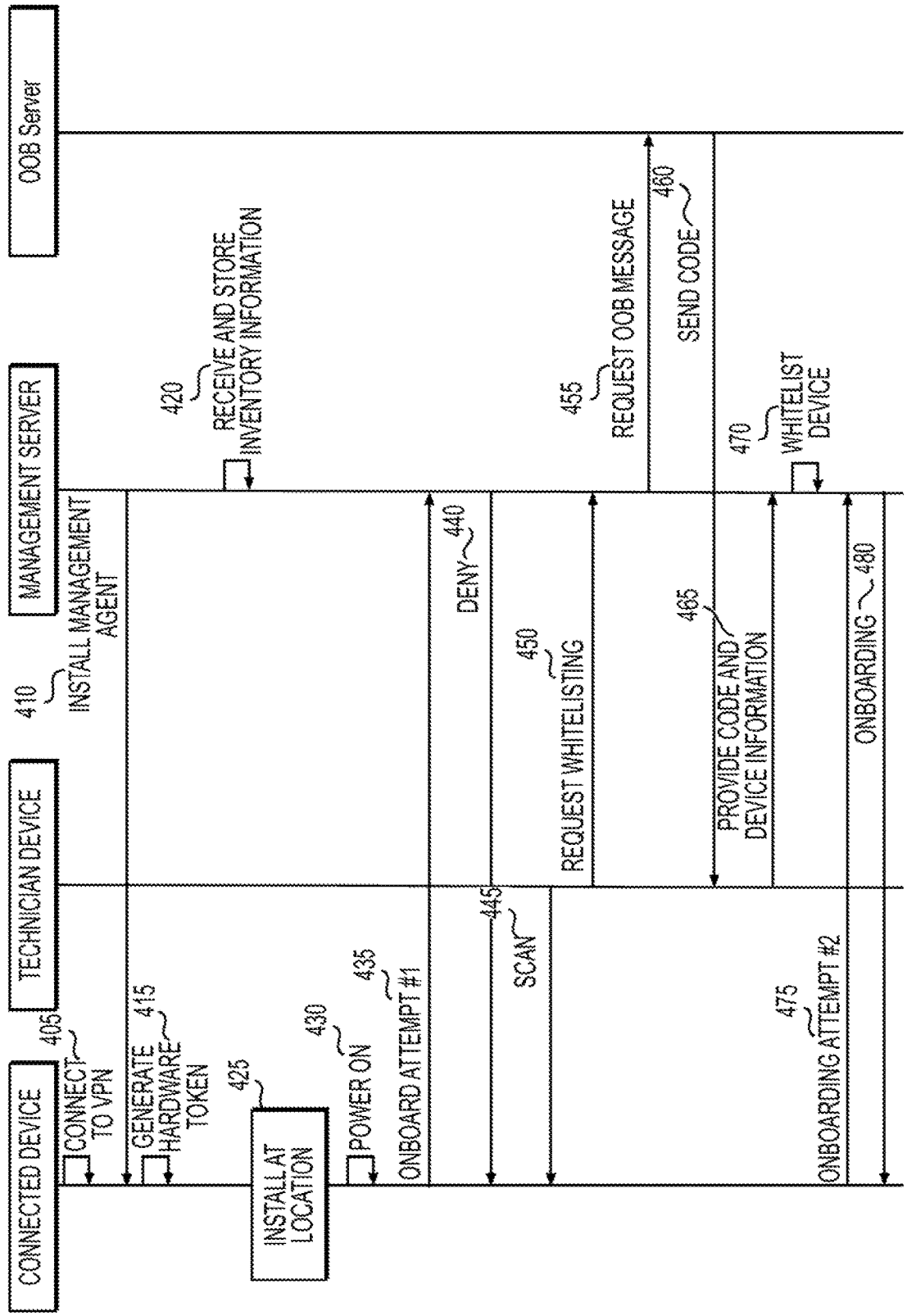
FIG. 4 is a sequence diagram of an example method for onboarding a device into a management system.

As in explained in more detail with respect to FIGS. 2-4, the whitelist 136 can be used to control which connected devices 110 are onboarded into the management system. In some examples, a connected device 110 can automatically attempt to onboard when powered on, based on instructions in the agent 114. However, to maintain appropriate security, the management server 130 can require input from the technician device 120 before allowing the connected device 110 to be onboarded. Once the appropriate input is received, the connected device 110 can be added to the whitelist 136 such that a future request to onboard will be allowed.

By incorporating input from the technician device 120 in the onboarding process, a system administrator can ensure that only authorized connected devices 110 are entering the management ecosystem. For example, an administrator may not want to authorize all devices that requests onboarding, as a malicious actor could then easily bypass the system's security protections. Requiring input from the technician device 120 ensures that the technician is, in fact, present at the connected device 110.

To provide an additional layer of security, the technician device 120 can be challenged with a question that can be answered only with information received from a separate, or out-of-band, communication channel. In the example of FIG. 1, this is performed by an out-of-band server 140. The out-of-band server 140 can include a message generator 142 capable of generating a passcode and sending it to a device. In some examples, the management server 130 instructs the out-of-band server 140 to send a passcode to the technician device 120, such as by sending an SMS message with an alphanumeric passcode within it. The out-of-band server 140 can generate a passcode, inform the management server 130 of the passcode, and send the passcode to the technician device 120. In some examples, the management server 130 provides a passcode for the out-of-band server 140 to use in the message.

The technician can view the message from the out-of-band server 140 and then enter the passcode into an appropriate field in the application 124. In some examples, the application 124 can prompt the user to enter the message based on receiving an indication from the management server 130 that a message has or will be sent to the technician device 120. The application 124 can transmit the passcode to the management server 130. Upon confirming the passcode, the management server 130 can add the relevant connected device 110 to the whitelist 136 such that onboarding can proceed. In some examples, authorizing a device 110 for the whitelist 136 can be performed by other means, such as by a system administrator approving a request.

FIG. 2 provides an illustration of an example method for onboarding a device into a management system, such as a UEM system. The illustration of FIG. 2 is broken down into four main categories: staging 210, inventory creation 220, whitelisting at location 230, and onboarding 240. Some of these stages can be carried out at different times and at different locations. For example, the staging area 210 stage can be carried out by a system administrator on site at an enterprise location. During staging 210, a connected device 110 can be communicatively coupled to the management server 130. This can be performed with a wired or wireless connection. In some examples, multiple connected devices 110 can be wireless connected to the management server 130 by using a local VPN.

Staging 210 can include provisioning the agent 114 to each relevant connected device 110. The agent 114 can include software code for carrying out agent responsibilities described through this disclosure. When multiple devices 110 are being staged, each device 110 can receive the same agent 114 software from the management server 130. This can include receiving a certificate for authenticating with the management server 130, a server uniform resource locator ("URL") to be used for device onboarding, and instructions to attempt onboarding at that URL automatically upon powering up of the device 110.

Staging 210 can also include generating a unique hardware token 116. In some examples, a software tool can be used to collect a device's 110 desktop management interface ("DMI") and format it in a usable format. The DMI can include a table with a description of the device's 110 hardware components. The description can be used to generate the hardware token 116. For example, the hardware token 116 can include an indication of a serial number, model number, MAC address, and any other hardware components of a device 110.

At the inventory creation stage 220, inventory information relating to the connected devices 110 can be provided to the management server 130 or stored at an inventory storage location 134 accessible to the management server 130. This can include, for example, a device ID, serial number, hardware token 116, assigned technician, deployment location, and any other relevant information about the device 110. In some examples, the inventory information is provided by scanning a code 112 present on the device 110.

In another example, the inventory information is gathered by a script executing on the device 110 and provisioned by the management server 130. In some examples, the inventory information can be gathered in bulk for a number of connected devices 110, such as by using a CSV or XML file. In some examples, a system administrator can manually enter inventory information for a connected device 110 through a console connected to the management server 130, causing the management server 130 to store that inventory information at the inventory storage 134.

The installation and whitelisting stage 230 can be performed at a location remote from the staging area. For example, a technician can install a connected device 110 at its intended location, such as at a customer location. An example would be installing a security camera 110 at a store or on a building. Once installed, the device 110 can be switched on and will automatically begin trying to onboard at the URL provided during staging 210. In some examples, the management server 130 must place the device 110 on a whitelist 136 in order to authorize the device 110 for onboarding. The whitelisting process is described in more detail with respect to FIG. 4.

At the onboarding stage 240, the connected device 110 can onboard with the management server 130 after being authorized and whitelisted. The onboarding process can include, for example, establishing a secure communication channel between the connected device 110 and the management server 130. It can also include providing profiles, rules, or commands from the management server 130 to the connected device 110. Onboarding can also include updating software or firmware of the device 110. It can further include checking compliance of the connected device 110 and storing relevant information about the device 110 at the management server 130.

FIG. 3 provides a flowchart of an example method for onboarding a connected device 110 into a management system. At stage 310, a management agent 114 can be loaded onto the connected device 110. In some examples, this stage is performed by an original equipment manufacturer ("OEM") that manufactures the device 110. At the time of manufacture, the OEM can upload the management agent 114 provided by an enterprise that has purchased or intends to purchase the device 110. The enterprise can provide the desired agent 114 to the OEM for inclusion.

In another example, this stage is performed by the enterprise after the connected device 110 is received from the manufacturer or reseller. In that example, a connected device 110 can be communicatively coupled to the management server 130. This can be performed with a wired or wireless connection. In some examples, multiple connected devices 110 can be wireless connected to the management server 130 by using a local VPN. The management server 130 can then utilize that connection to transmit the management agent 114 to the device 110. This stage can also include sending a certificate for authenticating with the management server 130, a server URL to be used for device 110 onboarding, and instructions to attempt onboarding at that URL automatically upon powering up of the device 110.

Stage 320 can include receiving inventory information for the connected device 110. Inventory information relating to the connected devices 110 can be provided to the management server 130, such as at the inventory storage location 134. The inventory information can include, for example, a device ID, serial number, hardware token 116, assigned technician, deployment location, and any other relevant information about the device 110. In some examples, the inventory information is provided by scanning a code 112 present on the device 110. In another example, the inventory information is gathered by a script executing on the device 110 and provisioned by the management server 130. In some examples, the inventory information can be provided in bulk for a number of connected devices 110, such as by using a CSV or XML file. In some examples, a system administrator can manually enter inventory information for a connected device 110 through a console connected to the management server 130, causing the management server 130 to store that inventory information at the inventory storage 134.

Stage 330 can include receiving a request to whitelist the connected device 110. In one example, the connected device 110 needs to be whitelisted before it can onboard itself using a hardware token, for example. The whitelisting request can be received at the management server 130 from the technician device 120, in one example. The technician device 120 can request whitelisting through an application 124 executing on the technician device 120, which communicates with the management server 130 directly. In some examples, the management server 130 can require input from the technician device 120 before allowing the connected device 110 to be onboarded. Once the appropriate input is received, the connected device 110 can be added to the whitelist 136 such that a future request to onboard will be allowed. This ensures that the technician is the individual requesting access, rather than an unknown party.

Authorizing the connected device 110 to be added to the whitelist 136 can be performed as part of stage 340. In some examples, authorization is provided in response to receiving the request at stage 330. In another example, to provide an additional layer of security, the technician device 120 can be challenged with a question that can be answered only with information received from a separate, out-of-band communication channel. For example, an out-of-band server 140 can generate a passcode and send it to a device. In some examples, the management server 130 instructs the out-of-band server 140 to send a passcode to the technician device 120, such as by sending an SMS message with an alphanumeric passcode within it. The out-of-band server 140 can generate a passcode, inform the management server 130 of the passcode, and send the passcode to the technician device 120. In some examples, the management server 130 provides a passcode for the out-of-band server 140 to use in the message. The technician can view the message from the out-of-band server 140 and then enter the passcode into an appropriate field in the application 124.

Upon confirming the passcode, the management server 130 can add the relevant connected device 110 to the whitelist 136 such that onboarding can proceed. In some examples, authorizing a device 110 for the whitelist 136 can be performed by other means, such as by a system administrator approving a request. The connected device 110 can then be onboarded at stage 350. The onboarding process can include, for example, establishing a secure communication channel between the connected device 110 and the management server 130. It can also include providing profiles, rules, or commands from the management server 130 to the connected device 110. Onboarding can also include updating software or firmware of the device 110. It can further include checking compliance of the connected device 110 and storing relevant information about the device 110 at the management server 130.

FIG. 4 provides a sequence diagram of an example method for onboarding a device into a management system. At stage 405, a connected device 110 is connected to a VPN. This stage can be performed by an administrator that has access to the connected device 110, for example. The administrator can use an SSH connection or a physical port on the device 110 to connect the device 110 to the management server 130 or to an administrator device. The administrator device can be a computing device used for staging actions such as connecting the device 110 to a VPN or providing inventory information relating to the device 110 to the management server 130. In some examples, multiple connected devices 110 can be connected to the VPN.

At stage 410, the management server 130 can provision a management agent 114 to the connected device 110. The management server 130 can send the management agent 114 through the VPN connection, for example. The management agent 114 can include software code for carrying out instructions provided by the management server 130. In some examples, these instructions can be provided in the form of a profile that includes rules for the management agent 114 to follow. When multiple devices 110 are being staged, each device 110 can receive the same agent 114 software from the management server 130. This can include receiving a certificate for authenticating with the management server 130, a server URL to be used for device onboarding, and instructions to attempt onboarding at that URL automatically upon powering up of the connected device 110.

At stage 415, the connected device 110 can receive or generate a hardware token 116. In some examples, the management server 130 can provision to the connected device 110 a software tool that can collect the device's 110 DMI and format it in a usable format, if necessary. The DMI can include a table with a description of the device's 110 hardware components. The description can be used to generate the hardware token 116, either by the connected device 110, the management server 130, or an administrator device. The hardware token 116 can include an indication of a serial number, model number, MAC address, and any other hardware components of a device 110. The hardware token 116 can be stored at the connected device 110 as described with respect to FIG. 1.

At stage 420, the management server 130 can receive and store inventory information for the connected device 110. In some examples, the inventory information is not provided to the management server 130 but rather stored at a storage location accessible to the management server 130. The inventory information can include, for example, a device ID, serial number, hardware token 116, assigned technician, intended deployment location, and any other relevant information about the device 110.

In some examples, the inventory information is gathered by an administrator device. For example, the administrator device can be used to scan a code 112 on the connected device 110 to obtain a serial number. The administrator device can also be used to assign a connected device 110 to a particular technician or deployment location. The administrator device can also assign a connected device 110 to a user, user group, device group, or smart group. In some examples, profiles, policies, or rules can be applied to devices based on the group to which a device belongs. For example, different rules can be assigned to user devices in different department groups within an organization, such as sales and engineering.

In some examples, the connected device 110 provides inventory information to the administrator device, which in turn packages that inventory information with additional information before providing it to the management server 130. As an example, an administrator can use an administrator device connected to the same VPN described with respect to stage 405. This can allow the administrator device to receive information from the connected device 110, such as the hardware token 116. The administrator can scan a code 112 on the connected device 110 to obtain a serial number and then associate that serial number with the received hardware token 116. The administrator can also configure options through the administrator device, such as by assigning an installation location or technician. The administrator device can then package this information and provide it to the management server 130. At stage 420, the management server 130 can receive that information and store it.

At stage 425, the connected device 110 can be installed on location. In some examples, the location can be remote from the administrator, management server 130, or even the entire enterprise. For example, the connected device 110 can be an appliance being installed in a cafeteria, a security camera being installed at a consumer store, or an ATM being installed at a bank. Installation can include mounting the connected device 110 and connecting it to a power source. The connected device 110 can then be powered on at stage 430.

At stage 435, the connected device 110 can attempt to onboard with the management server 130. In some examples, the management agent 114 installed on the connected device 110 causes it to attempt onboarding upon powering on and at regular intervals thereafter. The attempt can include sending a hardware token from the connected device 110 to the management server 130 rather than a username and password. At this stage of the example method, however, the connected device 110 is not yet whitelisted by the management server 130. As a result, the management server 130 denies the request at stage 440. In some examples, stage 440 also includes sending a notification to the technician or administrator, or both, identifying the connected device 110 that requested onboarding as well as the resulting denial.

At stage 445, the installing technician can begin the process of whitelisting the connected device 110 by scanning a code 112 present on the device 110. The technician can alternatively enter a serial number of the connected device 110 into an application 124 executing on the technician device 120. The application 124 can be used to request whitelisting of the connected device 110 at stage 450. For example, after scanning or otherwise inputting the required information into the application 124, the technician can select an option for requesting whitelisting. The application 124 can then connect to the management server 130 and provide an identification of the connected device 110 and technician device 120. The application 124 can also provide a hardware token 116 associated with the connected device 110, along with any other required information about the device 110.

In one example, the application 124 can generate the hardware token 116 based on a key that is also used to generate the hardware token 116 on the connected device 110. For example, a hardware token 116 generated from a MAC address can be the same on the connected device 110 as the hardware token 116 generated by the application 124. This can allow for an additional layer of security rather than just passing an identifier that is readable from the connected device 110, in an example.

The management server 130 can authorize the connected device 110 for whitelisting in a variety of ways. In some examples, the management server 130 checks a compliance status of the connected device 110, and if the status shows that the device 110 is compliant, the management server 130 can add the device 110 to the whitelist 136. In another example, the management server 130 can prompt an administrator for manual approval.

In yet another example, shown in FIG. 4, the management server 130 can contact an out-of-band server 140 at stage 455 to request an out-of-band authentication process. The out-of-band server 140 can generate a code, or use a code provided by the management server 130, and send that code to the technician device. The out-of-band server 140 can utilize a communication channel separate from the channels used in previous stages of this example method, such as by sending to the technician device 120 an SMS or email containing a passcode, at stage 460.

At stage 465, the technician device can provide the passcode to the management server 130 to confirm that the technician is the individual requesting whitelisting. For example, the application 124 can prompt the technician to enter the passcode once it is received. The technician can navigate within the application 124 to a screen that shows one or more connected devices 110. The technician can then select the connected device 110 at issue, select an option to provide a passcode, and then enter the passcode in a text field. The application can then send the passcode to the management server 130.

The management server 130 can confirm the passcode and add the connected device to the whitelist at stage 470. In some examples, the management server 130 also sends an indication to the technician device 120 or connected device 110 that the whitelist addition has been performed.

At stage 475, the connected device 110 can attempt to onboard again by contacting the URL provided at stage 410. The management server 130 can check the whitelist, and after confirming that the connected device 110 is on the whitelist, begin the process of onboarding the connected device at stage 480. The onboarding process can include, for example, establishing a secure communication channel between the connected device 110 and the management server 130. It can also include providing profiles, rules, or commands from the management server 130 to the connected device 110. Onboarding can also include updating software or firmware of the device 110. It can further include checking compliance of the connected device 110 and storing relevant information about the device 110 at the management server 130.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for onboarding a device into a management system, comprising:
   loading a management agent onto the device, wherein the management agent is configured to communicate with the management system;
   receiving inventory information for the device;
   receiving a request from a technician device to whitelist the device;
   authorizing the device to be added to the whitelist by:
      causing an out-of-band message comprising a code to be sent to the technician device; and
      receiving the code and device information from the technician device; and
   in an instance in which the device has been added to the whitelist, onboarding the device into the management system, wherein onboarding comprises sending management information to the management agent, and wherein onboarding allows the management system to exercise management control over the device by providing instructions to the management agent.

2. The method of claim 1, further comprising, before authorizing the device to be added to the whitelist:
   receiving an onboarding request at the management system from the device; and
   denying the onboarding request in an instance where the device is not in the whitelist.

3. The method of claim 1, wherein causing an out-of-band message comprising a code to be sent to the technician device comprises requesting an out-of-band server to send the code to the technician device.

4. The method of claim 3, wherein the response from the technician is provided through an application executing on the technician device of the technician and in communication with the management system.

5. The method of claim 3, wherein the out-of-band message is at least one of a short message service (SMS) message or an email.

6. The method of claim 1, wherein the inventory information comprises a hardware token created using hardware information for the device.

7. The method of claim 1, further comprising pre-registering the device using initial purchase information for the device.

8. A non-transitory, computer-readable medium containing instructions that, when executed by a hardware-based processor, performs stages for onboarding a device into a management system, the stages comprising:
   loading a management agent onto the device, wherein the management agent is configured to communicate with the management system;
   receiving inventory information for the device;
   receiving a request from a technician device to whitelist the device;
   authorizing the device to be added to the whitelist by:
      causing an out-of-band message comprising a code to be sent to the technician device; and
      receiving the code and device information from the technician device; and
   in an instance in which the device has been added to the whitelist, onboarding the device into the management system, wherein onboarding comprises sending management information to the management agent, and wherein onboarding allows the management system to exercise management control over the device by providing instructions to the management agent.

9. The non-transitory, computer-readable medium of claim 8, the stages further comprising, before authorizing the device to be added to the whitelist:
receiving an onboarding request at the management system from the device; and
denying the onboarding request in an instance where the device is not in the whitelist.

10. The non-transitory, computer-readable medium of claim 8, wherein causing an out-of-band message comprising a code to be sent to the technician device comprises requesting an out-of-band server to send the code to the technician device.

11. The non-transitory, computer-readable medium of claim 10, wherein the response from the technician is provided through an application executing on the technician device of the technician and in communication with the management system.

12. The non-transitory, computer-readable medium of claim 10, wherein the out-of-band message is at least one of a short message service (SMS) message or an email.

13. The non-transitory, computer-readable medium of claim 8, wherein the inventory information comprises a hardware token created using hardware information for the device.

14. The non-transitory, computer-readable medium of claim 8, the stages further comprising pre-registering the device using initial purchase information for the device.

15. A system for onboarding a device into a management system, comprising:
a memory storage including a non-transitory, computer-readable medium comprising instructions; and
a management server including a hardware-based processor that executes the instructions to carry out stages comprising:
loading a management agent onto the device, wherein the management agent is configured to communicate with the management system;
receiving inventory information for the device;
receiving a request from a technician device to whitelist the device;
authorizing the device to be added to the whitelist by:
causing an out-of-band message comprising a code to be sent to the technician device; and
receiving the code and device information from the technician device; and
in an instance in which the device has been added to the whitelist, onboarding the device into the management system, wherein onboarding comprises sending management information to the management agent, and wherein onboarding allows the management system to exercise management control over the device by providing instructions to the management agent.

16. The system of claim 15, the stages further comprising, before authorizing the device to be added to the whitelist:
receiving an onboarding request at the management server from the device; and
denying the onboarding request in an instance where the device is not in the whitelist.

17. The system of claim 15, wherein causing an out-of-band message comprising a code to be sent to the technician device comprises requesting an out-of-band server to send the code to the technician device.

18. The system of claim 17, wherein the response from the technician is provided through an application executing on the technician device of the technician and in communication with the management server.

19. The system of claim 17, wherein the out-of-band message is at least one of a short message service (SMS) message or an email.

20. The system of claim 15, wherein the inventory information comprises a hardware token created using hardware information for the device.

* * * * *